(12) United States Patent
Deaver et al.

(10) Patent No.: US 6,351,511 B1
(45) Date of Patent: Feb. 26, 2002

(54) LOCAL REPAIR OF TOP GUIDE IN BOILING WATER REACTOR BY INSTALLATION OF CRUCIFORM BEAM

(75) Inventors: Gerald Alan Deaver, San Jose; James Walton Pyron, Redding; Anh Ngoc Nguyen, Milpitas, all of CA (US)

(73) Assignee: General Electric Company, San Jose, CA (US)

( * ) Notice: Subject to any disclaimer, the term of this patent is extended or adjusted under 35 U.S.C. 154(b) by 0 days.

(21) Appl. No.: 08/631,186

(22) Filed: Apr. 12, 1996

(51) Int. Cl.[7] .............................................. G21C 19/00
(52) U.S. Cl. ....................... 376/260; 376/362; 376/347; 376/285
(58) Field of Search ................................ 376/260, 285, 376/302, 347, 362, 364

(56) References Cited

U.S. PATENT DOCUMENTS 4,567,015 A * 1/1986 Bosshard ...................... 376/362
5,188,798 A * 2/1993 Okuyama et al. ............ 376/442
5,502,754 A * 3/1996 Erbes ............................ 376/302
5,521,951 A * 5/1996 Charnley et al. ............. 376/260

* cited by examiner

Primary Examiner—Daniel D. Wasil
(74) Attorney, Agent, or Firm—James E. McGinness; Dennis M. Flaherty (57) ABSTRACT

An apparatus for reinforcing weakened portions of the top guide assembly in a boiling water reactor. The repair apparatus includes a cruciform lattice segment which reinforces the damaged or weakened region of the top guide beam lattice. This cruciform lattice segment is held in place atop the existing top guide with specially designed straps. The cruciform lattice segment and associated straps are arranged so that a beam segment of the cruciform lattice segment bridges the weakened region in the cracked top guide. Thus, the bridging beam segment transmits loads across the weakened region of the top guide. The straps are designed to avoid interference with removal and installation of the fuel assemblies and the control rod blade which is inserted between the fuel assemblies.

12 Claims, 6 Drawing Sheets

LOCAL REPAIR OF TOP GUIDE IN BOILING WATER REACTOR BY INSTALLATION OF CRUCIFORM BEAM

FIELD OF THE INVENTION

This invention relates to the repair of boiling water reactor components which have been damaged or weakened by stress corrosion cracking. In particular, the invention relates to the repair of cracked beans in the top guide of a boiling water reactor.

BACKGROUND OF THE INVENTION

A conventional boiling water reactor (BWR) comprises a reactor pressure vessel (RPV) filled with cooling water, a core of nuclear fuel submerged in that water and a stainless steel cylinder, called the core shroud, which surrounds the nuclear fuel core and is concentric with the RPV walls The core shroud comprises a shroud flange for supporting the shroud heads, a circular cylindrical upper shroud wall having a top guide welded to the shroud flange, an annular top guide support ring welded to the bottom rim of the upper shroud wall, a circular cylindrical middle shroud wall comprising multiple sections welded in a stack, with a top rim of the middle shroud wall being welded to the top guide support ring, and an annular core plate support ring welded to the bottom rim of the middle shroud wall and to the top rim of a lower shroud wall. The entire shroud is supported by a shroud support, which is welded to the bottom rim of the lower shroud wall, and by an annular shroud support plate, which is welded at its inner diameter to the shroud support and at its outer diameter to the RPV wall. Reactor water flows down the annular space between the RPV wall and the shroud, around the lower rim of the shroud and up through the fuel core located within and surrounded by the cylindrical shroud.

The fuel core consists of a multiplicity of upright and parallel fuel bundle assemblies arranged in 2×2 arrays, each assembly consisting of an array of fuel rods inside a Zircaloy fuel channel. The assemblies of each array are separated by a cruciform gap which allows vertical travel of a cruciform control rod blade in between the fuel channels. Each control rod blade contains neutron-absorbing material. The power level is maintained or adjusted by positioning control rods up and down within the core while the fuel bundle assemblies are held stationary. Each array of fuel bundle assemblies is supported at the top by a top guide and at the bottom by a core plate. In particular, the top guide provides lateral support to the upper end of the fuel assemblies, neutron monitoring instrument assemblies and installed neutron sources, and maintains the correct fuel channel spacing to permit control rod insertion. The top guide is designed so that during periodic refueling operations, the fuel bundle assemblies can be lifted out of and lowered into the core without removing the top guide.

One type of top guide installed in certain types of BWRs has a fabricated design comprising a lattice of interlocking upper and lower beams held together by a large circular ring. The circular ring of the top guide sits on the top guide support ring of the shroud, and is provided with radially inwardly directed flanges that capture the distal ends of the beams. The beams and support ring are typically made of Type 304 stainless steel with high carbon content. The composition of standard Type 304 stainless steel is 18.0–20.0 wt. % Cr, 8.0–10.5 wt. % Ni, 2.0 wt. % Mn, 1.0 wt. % Si, 0.08 wt. % C, 0.045 wt. % P and 0.03 wt. % S.

The foregoing top guide design contains many creviced welded and unwelded connections, which are used to attach the lattice beam supports to the inner surface of the support ring and for rigid span support of the top guide structure over the core. The Type 304 stainless steel with high carbon content which is typically used in early BWR plants, in conjunction with the many creviced regions, results in the top guide being susceptible to intergranular stress corrosion cracking (IGSCC) and irradiation-assisted stress corrosion cracking (IASCC). Sustained exposure to conditions conducive to IGSCC and IASCC will eventually require repairs or complete top guide replacement.

SUMMARY OF THE INVENTION

The present invention is a device employed to repair damaged top guides having cracks in the beam lattice region. The invention permits use of a limited number of local repairs to the top guide without welding. Therefore, employment of the invention avoids the need for complete top guide replacement. Thus, this invention is expected to benefit the end user by facilitating in-reactor repair with reduced costs and reduced downtime.

The repair in accordance with the invention entails the installation of a cruciform lattice segment which reinforces the damaged or weakened region of the beam lattice. This cruciform lattice segment is held in place atop the existing top guide with specially designed straps. The cruciform lattice segment and associated straps are arranged so that a beam segment of the cruciform lattice segment bridges the weakened region in the cracked top guide. Thus, the bridging beam segment transmits loads across the weakened region of the top guide. The straps are designed to avoid interference with removal and installation of the fuel assemblies.

DETAILED DESCRIPTION OF THE PREFERRED EMBODIMENTS

Figure 1:
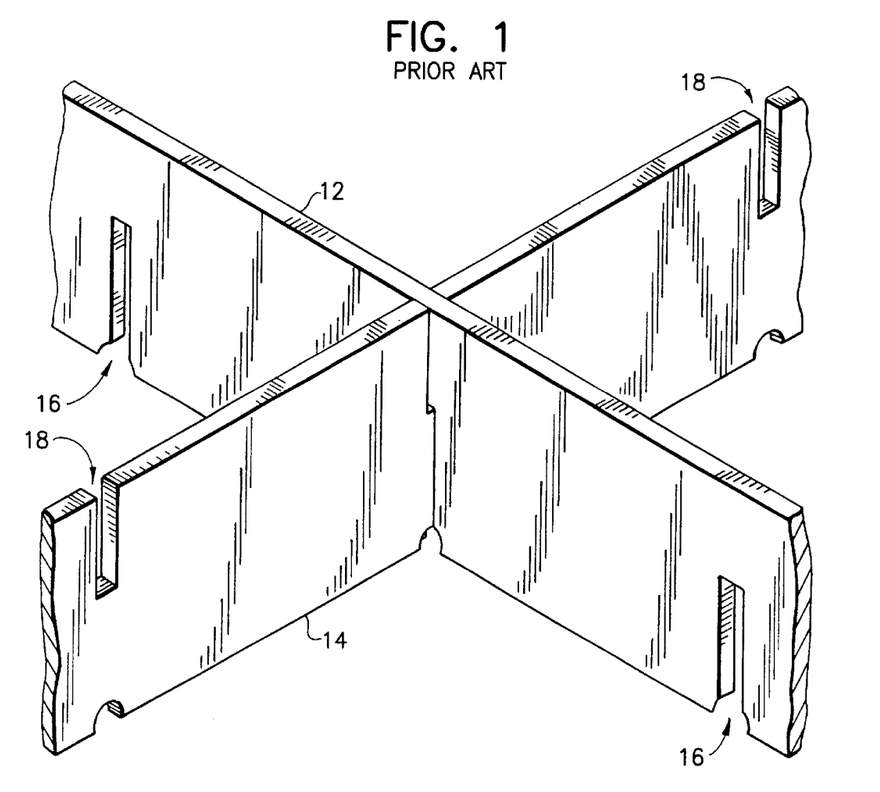
FIG. 1 is an isometric view of portions of two intersecting beans of a typical top guide.

As shown in FIG. 1, a typical top guide comprises a lattice of interlocking upper and lower beams 12 and 14, respectively. The lower edge of each upper beam 12 has a plurality of laterally spaced, vertically upwardly extending slots 16 for receiving a portion of a respective one of a plurality of mutually parallel lower beams extending generally perpendicular to the upper beams. Conversely, the upper edge of each lower beam 14 has a plurality of laterally spaced, vertically downwardly extending slots 18 for receiving a portion of a respective one of a plurality of mutually parallel upper beams extending generally perpendicular to the lower beams. The slots 16 and 18 enable the upper and lower beams 12 and 14 to be interlocked in "egg-crate" fashion. The beams are held at their ends to maintain the "egg-crate" geometry so that the beams can provide lateral support to the 2×2 arrays of fuel bundle assemblies 60 separated by spacers 62, shown in FIG. 3.

Figure 2:
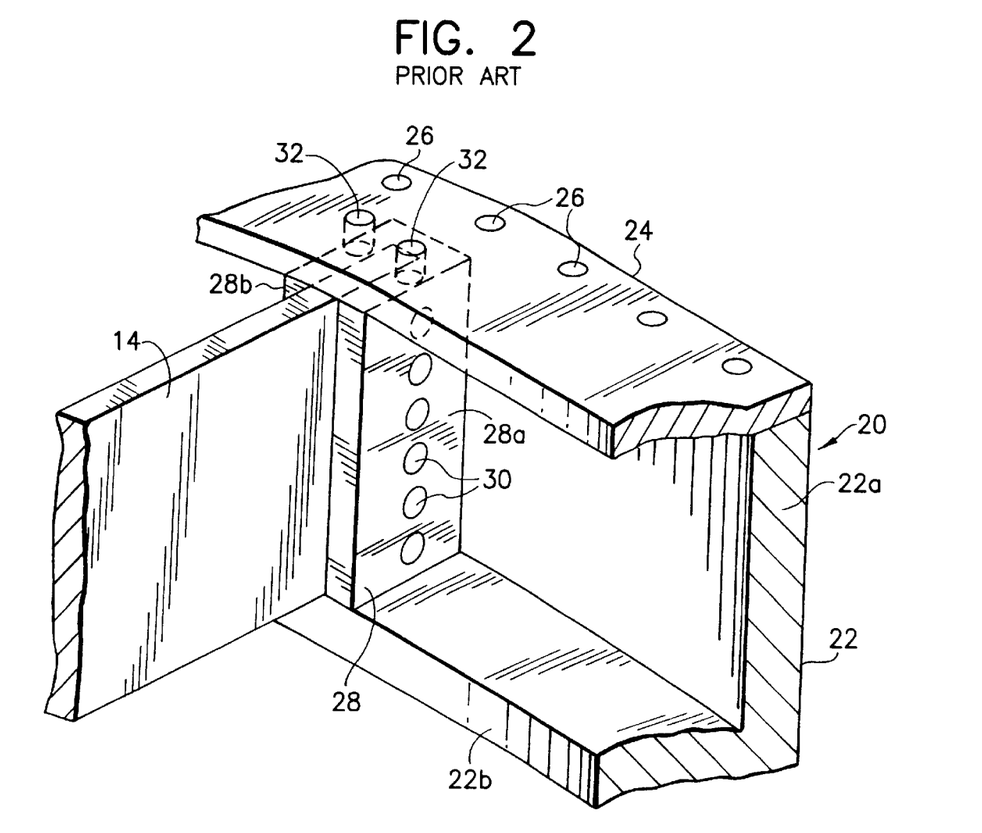
FIG. 2 is an isometric view of a peripheral portion of the typical top guide shown in FIG. 1.

The opposing ends of each beam of the typical top guide are supported by a circular support ring 20, shown in FIG. 2. The support ring 20 comprises a rim 22 and a rim top 24 which are fastened together by a multiplicity of bolts 26 circumferentially distributed along the ring 20. The rim 22 comprises a circular cylindrical wall 22a and a radially inwardly directed annular flange 22b integrally joined to a bottom end of the rim wall 22a. The rim top 24 also forms a radially inwardly directed annular flange extending generally parallel to flange 22b. The radius of the radially inner periphery of flange 22b is generally equal to the radius of the radially inner periphery of rim top 24. The rim 22 and rim top 24 form a channel for receiving the ends of the lattice beams.

As seen in FIG. 2, the end of each beam is coupled to a bracket 28 by means of a plurality of pins 30. The bracket 28 has a U-shaped cross section with a channel for receiving the end of the beam. The sidewalls 28a and 28b extend in parallel from opposite ends of a base 28c of bracket 28. (In the alternative, two separate plates not connected by a base could be used instead of bracket 28.) Bracket 28 may be a welded or cast structure. The sidewalls 28a and 28b each have a plurality of holes which extend in the thickness direction for receiving pins 30 which fasten the bracket 28 and the beam end together. In addition, each sidewall has a bore extending vertically downward from an upper end face for receiving a pin 32 which fastens the bracket 28 and the rim top 24 together. For the sake of clarity, only the portion of pin 32 which passes through the rip top is indicated by dashed lines, although it should be understood that the pin extends into the bracket. Each sidewall also has a bore extending vertically upward from a lower end face for receiving a pin (not shown) which fastens the bracket 28 and the rim flange 22b together. The pins which fasten bracket 28 to ring 20, in conjunction with the pins that fasten the bracket to the beam end, hold the beans and ring together, thus forming a top guide assembly which can be installed and removed as a single unit using a crane or other lifting equipment. The width of the bracket channel is slightly greater than the thickness of the beam end, so that the parallel sidewalls of bracket 28 block displacement of the beam end in the circumferential directions and oppose rotation of the beam end about a vertical axis.

During reactor operation, the reactor components are exposed to conditions which render welded joints and heat affected zones thereof susceptible to stress corrosion cracking. In particular, the crevice welds and heat affected zones at the intersections of the upper and lower beams of the top guide assembly are susceptible to stress corrosion cracking. The cracks which result can weaken the top guide and impair its ability to function as a lateral support. To avoid the cost of replacing the entire top guide when crack indications are discovered in certain regions of the bean lattice, it is desirable to provide a local repair to reinforce the cracked region.

Figure 3:
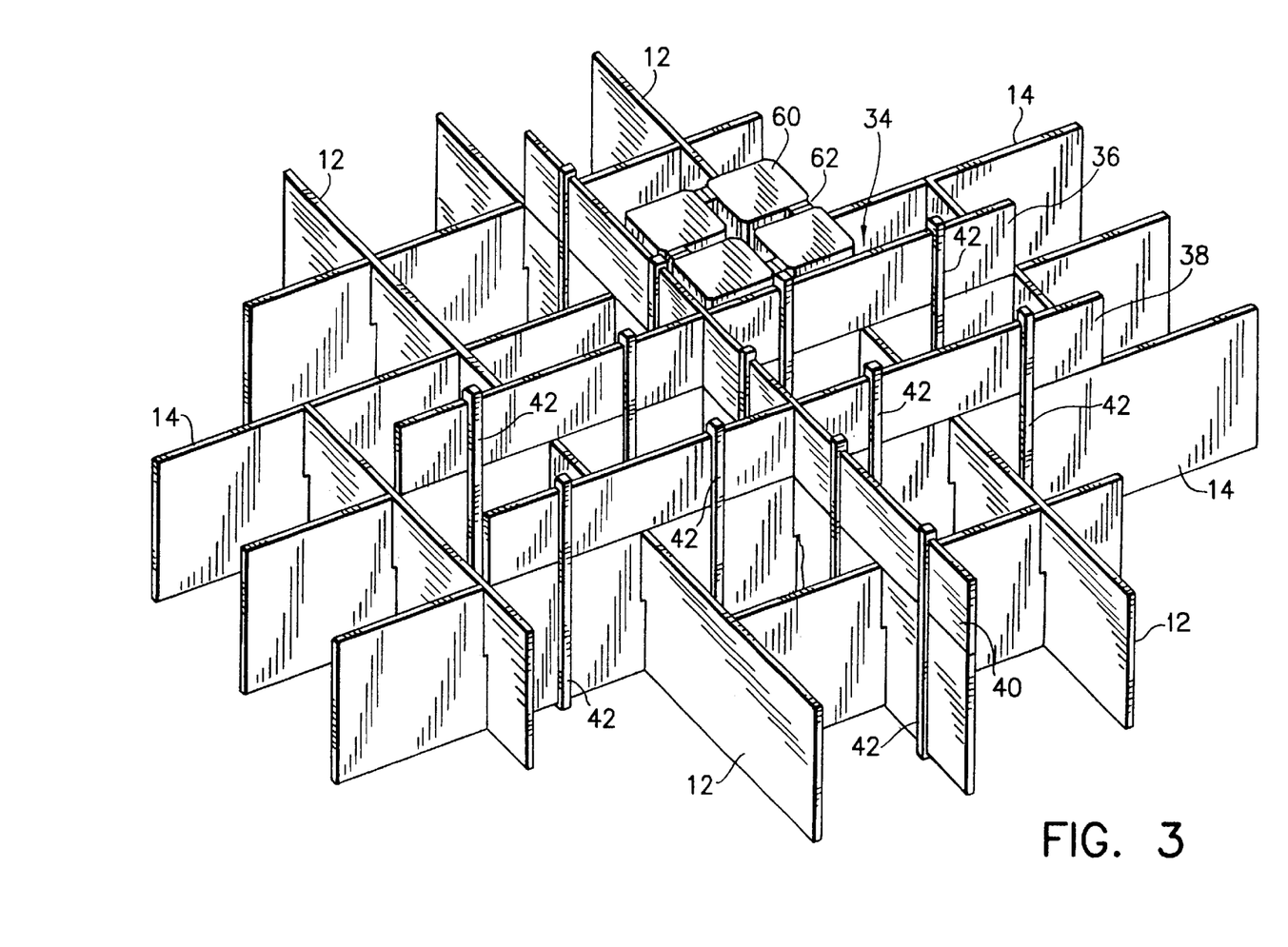
FIG. 3 is an isometric view of a top guide repaired in accordance with a preferred embodiment of the invention.
Figure 4:
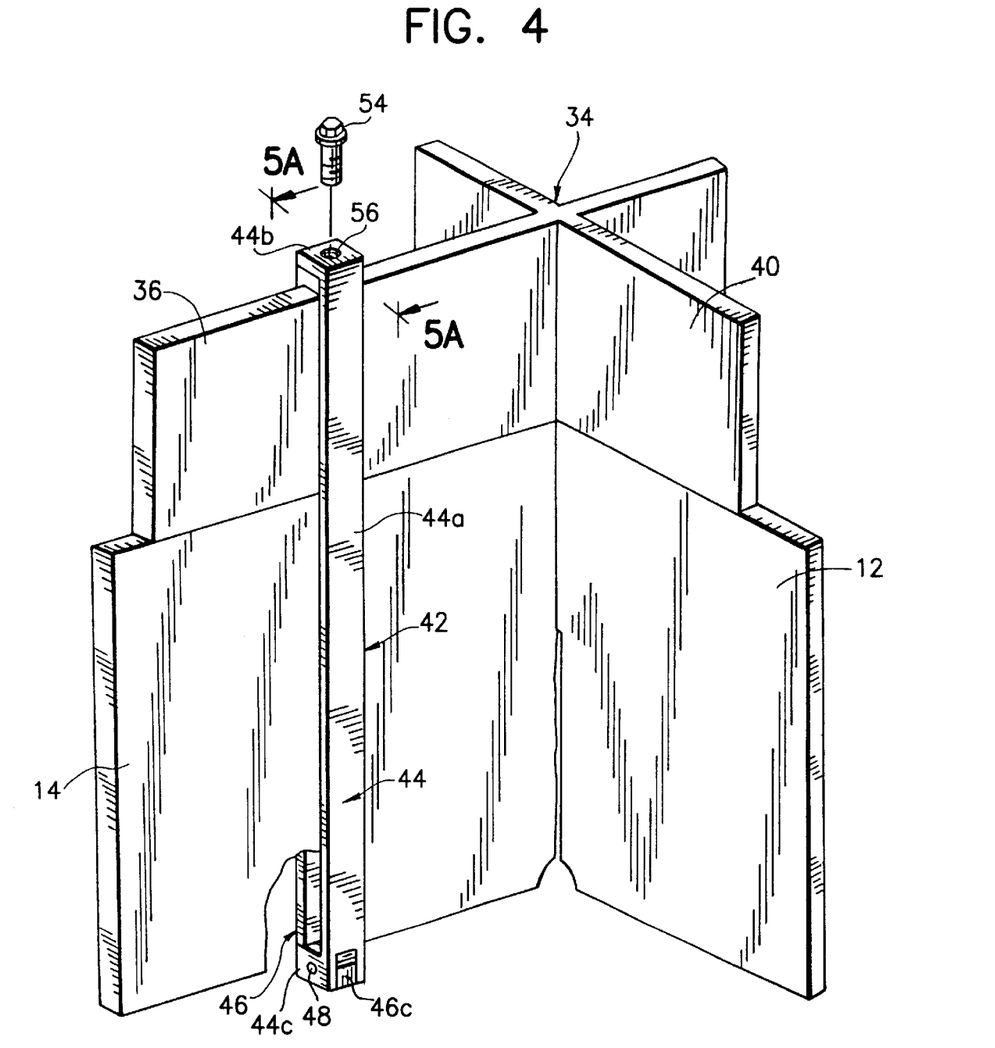
FIG. 4 is a partially exploded isometric view of portions of two intersecting beams of a top guide being reinforced with repair hardware in accordance with a preferred embodiment of the invention.

Hardware for carrying out such a local repair of the top guide assembly in accordance with a preferred embodiment of the invention is depicted in FIG. 3. This repair hardware is installed while the reactor is shut-down. The repair hardware shown in FIG. 3 comprises a cruciform lattice segment 34 having two parallel beam segments 36 and 38 which intersect a beam segment 40 at right angles, the beam segments 36 and 38 each being joined to the beam segment 40 either integrally or by welding. However, it should be understood that the term "cruciform lattice segment" as used herein includes any reinforcement structure having at least one beam segment intersecting at least one other beam segment at right angles. At a minimum, the cruciform lattice segment of the invention has only two beam segments which intersect at right angles. At a maximum, the cruciform lattice segment of the invention may have a first plurality of parallel beam segments intersecting a second plurality of parallel beam segments at right angles, thereby forming a reinforcement lattice. The cruciform lattice segment sits on top of the beam lattice of the top guide assembly, each beam segment of the cruciform lattice segment being aligned with a corresponding beam of the top guide lattice. The cruciform lattice segment is placed such that a respective beam segment of the cruciform lattice segment overlies each weakened region of the top guide lattice which requires reinforcement. Thus, for those embodiments of the cruciform lattice segment which have parallel beam segments, the parallel beam segments must have the same spacing as that of the top guide lattice beams to which the reinforcement beam segments are attached.

Regardless of the number of beam segments, the cruciform lattice segment is attached to the weakened beam lattice of the top guide assembly by a multiplicity of spaced straps 42. In the fully installed state, each strap 42 rigidly restrains the reinforcement beam segment and the underlying lattice beam against relative displacement in the vertical and lateral directions. As shown in FIG. 3, the cruciform lattice segment and associated straps are arranged so that the beam segments of the cruciform lattice segment bridge the weakened regions in the cracked top guide. Thus, the bridging beam segments transmit loads across the weakened regions of the top guide.

Figure 7:
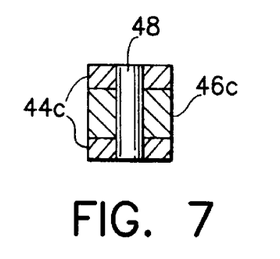

The structure of the strap 42 in accordance with the preferred embodiment of the invention will be described with reference to FIGS. 4–7. As best seen in FIG. 5B, each strap 42 comprises a pair of strap members 44 and 46 having a truncated U-shaped profile. Strap member 44 comprises a longitudinal member 44a, an upper transverse member 44b extending generally perpendicular to longitudinal member 44a and a pair of lower transverse members 44c extending generally perpendicular to longitudinal member 44a and parallel with each other. As best seen in FIG. 7, lower transverse members 44c form a clevis, each transverse member 44c having a hole for receiving the opposing ends of a clevis pin 48. Strap member 46 comprises a longitudinal member 46a, an upper transverse member 46b extending generally perpendicular to longitudinal member 46a and a lower transverse member 46c extending generally perpendicular to longitudinal member 46a and parallel with transverse member 46b. Lower transverse member 46c is a plate-shaped projection having a hole for receiving an intermediate portion of the clevis pin 48. The ends of the clevis pin are secured to the lower transverse members 44c of strap member 44. Clevis pin 48 is not secured to lower transverse member 46c, which allows strap member 46 to swing relative to strap member 44 about the clevis pin axis. As seen in FIG. 5B, the end face of transverse member 46c of strap member 46 has a chamfered surface 50 which contacts a corresponding chamfered surface 52 at the end of a slot formed in strap member 44 to retain the strap member 46 at the free swing-out position shown in FIG. 5B. Placement of strap member 46 in the free swing-out position shown in FIG. 5B creates a gap between the upper transverse members 44b and 44c which is wide enough to allow passage there-through of the stacked cruciform lattice beam segment 36 and top guide lattice beam 12 during installation of the straps.

Figure 5A:
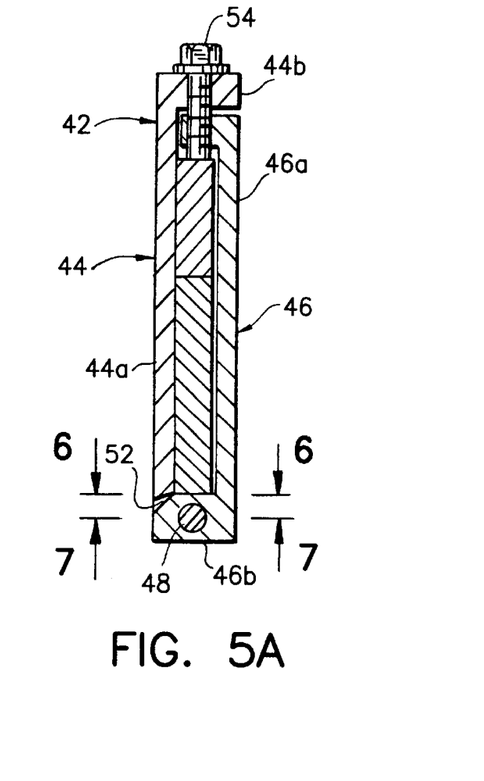
FIG. 5A is a sectional view showing the top guide repair hardware installed on a top guide, the section being taken along line 5A—5A indicated in FIG. 4.
Figure 5B:
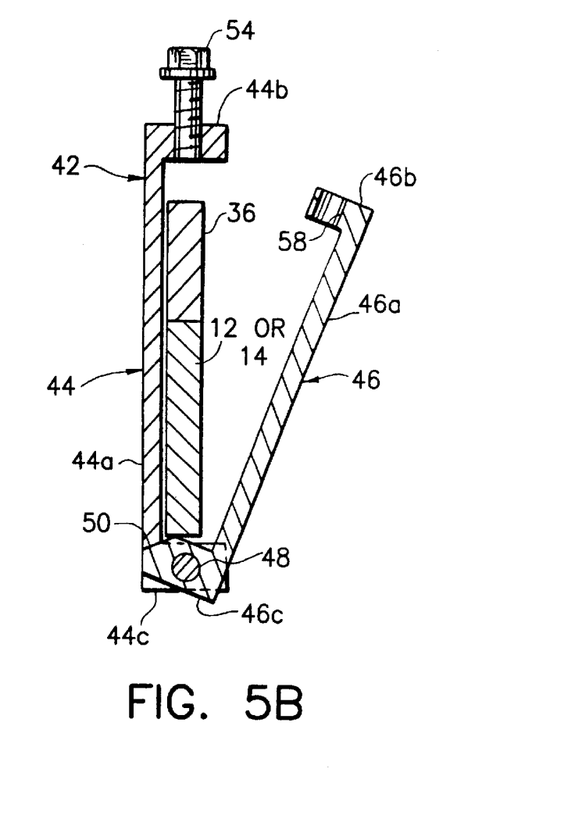
FIG. 5B is a sectional view showing the top guide repair hardware of FIG. 5A in an unfastened condition during an intermediate stage in the repair hardware installation procedure.
Figure 6:
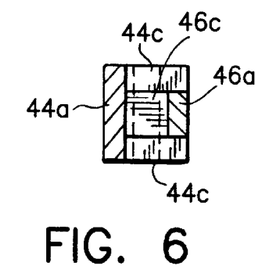
FIGS. 6 and 7 are sectional views showing the top guide repair hardware, the sections being respectively taken along lines 6—6 and 7—7 indicated in FIG. 5A.

As seen in FIG. 5A, the distance separating the, transverse members 46b and 46c is greater than the overall height of the stacked cruciform lattice beam segment 36 and top guide lattice beam 12. Therefore, the stacked beam segment and beam can fit between the transverse members 46b and 46c. Furthermore, the distance separating the transverse members 44b and 44c is greater than the overall height of the stacked cruciform lattice beam segment 36 and top guide lattice beam 12 by an amount sufficient to allow the upper transverse member 46b to enter the gap between the upper transverse member 44b and the cruciform lattice beam segment 36 when strap member 46 is swung from the free swing-out position shown in FIG. 5B to the closed position shown in FIG. 5A.

In the closed position, the strap members 44 and 46 are fastened together using a hex screw 54 as shown in FIG. 5A. The upper transverse members 44b and 46b have respective threaded bores 56 (see FIG. 4) and 58 (see FIG. 5B). The threaded bores 56 and 58 are located such that they are coaxial when the strap member 46 is swung into the closed position. In the coaxial state, the threaded bores 56 and 58 can engage the threads on the hex screw screwed therein. As shown in FIG. 5B, the hex screw 54 is preinstalled by threadably coupling the distal portion of the screw shaft in the threaded bore 56 formed in upper transverse member 44b. As shown in FIG. 5A, the shaft of hex screw 54 has a length such that the distal end of the shaft will bear against the top surface of the cruciform lattice beam segment 36 when the hex screw is further threadbly coupled in the threaded bore 58 formed in upper transverse member 46b and then fully torqued to urge the bottom surface of the top guide lattice beam 36 against the upper surfaces of the lower transverse members 44c and 46c. The hex screw 54 is torqued to produce a desired preload in the strap.

In accordance with the preferred embodiments of the invention, the cruciform lattice segment 34, the straps 42 and the hex screws 54 are made of XM-19 stainless steel, and the clevis pin 48 is made of Type 304 stainless steel. As previously noted, the beams of the top guide lattice are also made of Type 304 stainless steel. XM-19 stainless steel has higher strength than Type 304 stainless steel.

During repair hardware installation, the reactor is shutdown and the temperature of both the top guide beams and the repair hardware are relatively low. After the repair has been completed and the reactor has been restarted, the temperature of the top guide lattice beams and the repair hardware rises. Because the straps and the top guide lattice beams are made of different materials having different coefficients of thermal expansion, the strap and the beam undergo differential thermal expansion, thereby applying a thermal load to the strap in addition to the preload. For example, Type 304 stainless steel has a coefficient of thermal expansion, $\alpha_{304SS}=9.4244\times10^{-6}$ inch/inch/° F. In contrast, XM-19 stainless steel has a coefficient of thermal expansion $\alpha_{XM-19}=8.9464\times10^{-6}$ inch/inch/° F. The thermal load arising from differential thermal expansion of these materials helps to secure the repair hardware in place.

Figure 8:
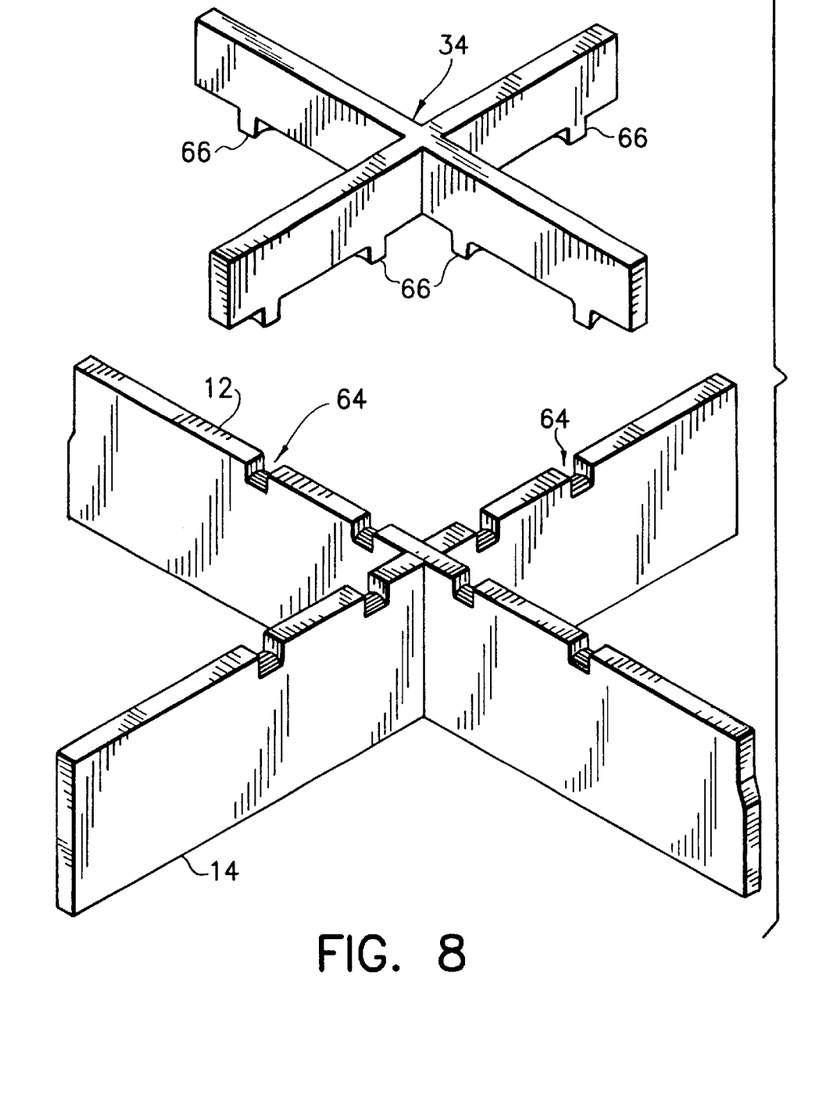
FIG. 8 is an exploded isometric view of a cruciform reinforcement beam and modified top guide prior to coupling in accordance with a preferred embodiment of the invention.

A further refinement in accordance with the present invention is shown in FIG. 8. In order to resist displacement of the cruciform lattice segment relative to the top guide beam lattice in directions parallel to the upper and lowers top guide beams, a plurality of spaced grooves 64 can be formed on the upper edges of the upper and lower beams 12 and 14 in the reinforcement region. Grooves 64 can be formed by electrodischarge machining in a conventional manner. Correspondingly, the lower edges of the cruciform lattice beam segments are provided with projections 66 which are configured and spaced to form-fit inside the grooves 64. The interlocking relationship of grooves 64 and projections 66 prevents shear displacement of the cruciform lattice segment 34 relative to the top guide beams 12 and 14.

The preferred embodiments of the top guide repair apparatus in accordance with the invention have been disclosed for the purpose of illustration Variations and modifications of the disclosed structure which fall within the concept of this invention will be readily apparent to persons skilled in the art. All such variations and modifications are intended to be encompassed by the claims set forth hereinafter.

We claim:

1. A method for reinforcing a beam of a top guide lattice for laterally supporting fuel assemblies in a nuclear reactor pressure vessel, the top guide lattice beam having a weakened region, comprising the steps of:

placing a reinforcement member on top of and in alignment with the top guide lattice beam, said reinforcement member overlying and having sufficient stiffness to transmit loads across the weakened region of the top guide lattice beam;

installing a first strap around a first portion of the top guide lattice beam and a first portion of said reinforcement member;

fastening said first strap to hold said first portions of the top guide lattice beam and said reinforcement member together;

installing a second strap around a second portion of the top guide lattice beam and a second portion of said reinforcement member; and fastening said second strap to hold said second portions of the top guide lattice beam and said reinforcement member together;

wherein said first and second portions of the top guide lattice beam are on opposing sides of the weakened region, and said reinforcement member bridges the weakened region.

2. The method as defined in claim 1, wherein said straps and said reinforcement member are made of a material having a strength greater than the strength of the top guide lattice beam material.

3. The method as defined in claim 1, wherein said straps and said reinforcement member are made of a material having a coefficient of thermal expansion less than the coefficient of thermal expansion of the top guide lattice beam material.

4. The method as defined in claim 1, further comprising the step of:

constructing a cruciform lattice segment comprising said reinforcement member and at least one beam segment intersecting said reinforcement member at right angles wherein said placing step comprises the step of placing said cruciform lattice segment on top of the top guide lattice.

5. A method for reinforcing a beam of a top guide lattice for laterally supporting fuel assemblies in a nuclear reactor pressure vessel, the top guide lattice beam having a weakened region, comprising the steps of:

constructing said reinforcement member with a projection an a bottom edge thereof;

forming at least one groove in a top edge of said top guide lattice beam having said weakened region, said groove having a configuration in which said projection is form-fitting;

placing said reinforcement member on top of said top guide lattice beam with said projection inserted in said groove, said reinforcement member overlying the weakened region; and attaching said reinforcement member to the top guide lattice beam at locations on opposing sides of the weakened region, said reinforcement member having sufficient stiffness to transmit loads across the weakened region, wherein said attaching step is performed without welding.

6. A method for reinforcing a beam of a top guide lattice for laterally supporting fuel assemblies in a nuclear reactor pressure vessel, the top guide lattice beam having a weakened region, comprising the steps of:

strapping a reinforcement member to the top guide lattice beam at first and second locations on opposing sides of said weakened region, said reinforcement member having sufficient stiffness to transmit loads across said weakened region;

constructing said reinforcement member with a projection on a bottom edge thereof;

forming at least one groove in a top edge of said top guide lattice beam having said weakened region, said groove having a configuration in which said projection is form-fitting; and placing said reinforcement member on top of said top guide lattice beam with said projection inserted in said groove.

7. The method as defined in claim 6, further comprising the step of placing said reinforcement member on top of and in alignment with the top guide lattice beam prior to said strapping step.

8. The method as defined in claim 6, wherein said strapping step comprising the steps of:

installing a first strap around the top guide lattice beam and said reinforcement member at a first location; and installing a second strap around the top guide lattice beam and said reinforcement member at a second location, wherein said straps and said reinforcement member are made of a material having a strength greater than the strength of the top guide lattice beam material.

9. The method as defined in claim 6, wherein said strapping step comprising the steps of:

installing a first strap around the top guide lattice beam and said reinforcement member at a first location; and installing a second strap around the top guide lattice beam and said reinforcement member at a second location, wherein said straps and said reinforcement member are made of a material having a coefficient of thermal expansion less than the coefficient of thermal expansion of the top guide lattice beam material.

10. A method for reinforcing a beam of a top guide lattice for laterally supporting fuel assemblies in a nuclear reactor pressure vessel, the top guide lattice beam having a weakened region, comprising the steps of:

strapping a cruciform lattice segment on top of said top guide lattice in a position wherein a beam segment of said cruciform lattice segment bridges said weakened region;

constructing said beam segment with a projection on a bottom edge thereof;

forming at least one groove in a top edge of said top guide lattice, said groove having a configuration in which said projection is form-fitting; and placing said cruciform lattice segment on top of said top guide lattice with said projection inserted in said groove.

11. The method as defined in claim 10, wherein said strapping step comprising the steps of:

installing a first strap around said top guide lattice and said beam segment at a first location on one side of said weakened region; and installing a second strap around said top guide lattice beam and said beam segment at a second location on another side of said weakened region, wherein said straps and said cruciform lattice segment are made of a material having a strength greater than the strength of the top guide lattice material.

12. The method as defined in claim 10, wherein said strapping step comprising the steps of:

installing a first strap around said top guide lattice and said beam segment at a first location on one side of said weakened region; and installing a second strap around said top guide lattice beam and said beam segment at a second location on another side of said weakened region, wherein said straps and said cruciform lattice segment are made of a material having a coefficient of thermal expansion less than the coefficient of thermal expansion of the top guide lattice material.

* * * * *